Feb. 16, 1965   R. F. TAYLOR   3,169,440
TENSION INDICATING DEVICES FOR INSTANCE IN ROOF BOLTING
Filed Sept. 5, 1961   2 Sheets-Sheet 1
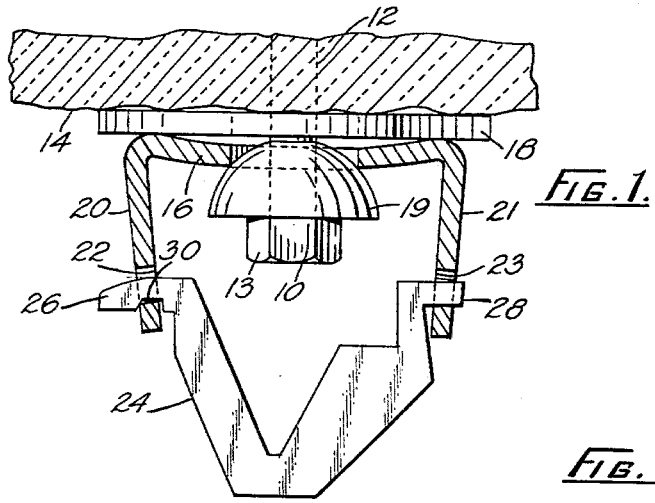
FIG.1.
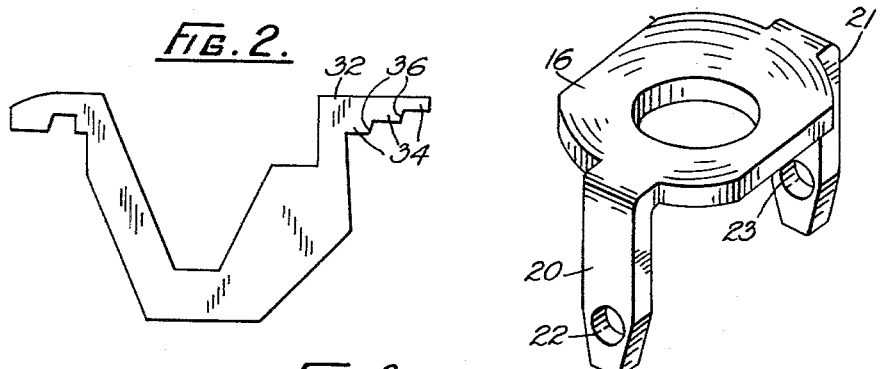
FIG.2.   FIG.6.
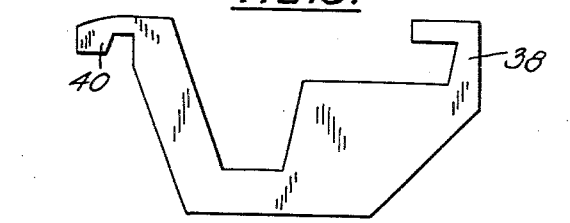
FIG.3.   FIG.5.
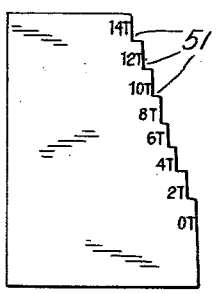
FIG.4.
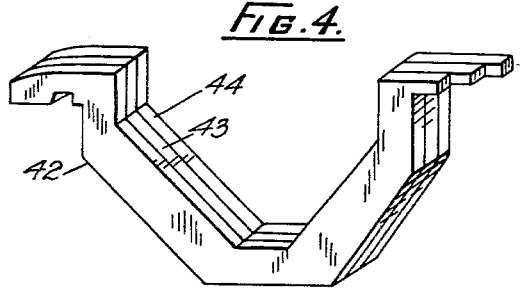
INVENTOR
RICHARD FRANCIS TAYLOR
BY Irwin S. Thompson
ATTY.

Feb. 16, 1965 R. F. TAYLOR 3,169,440
TENSION INDICATING DEVICES FOR INSTANCE IN ROOF BOLTING
Filed Sept. 5, 1961 2 Sheets-Sheet 2
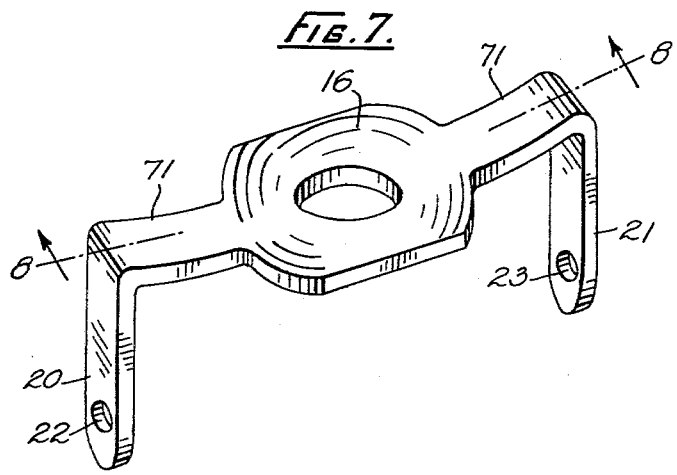
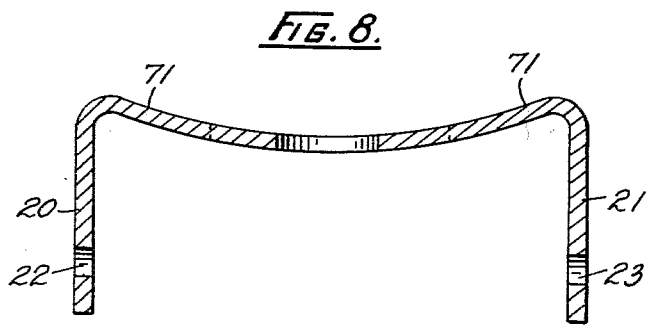
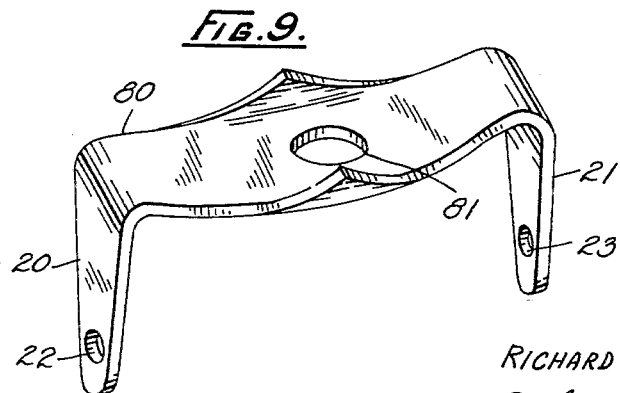
INVENTOR
RICHARD FRANCIS TAYLOR
By Irwin S. Thompson
ATTY.

United States Patent Office 3,169,440
Patented Feb. 16, 1965

3,169,440
TENSION INDICATING DEVICES FOR INSTANCE IN ROOF BOLTING
Richard Francis Taylor, Johannesburg, Transvaal, Republic of South Africa, assignor to Anglo-Transvaal Consolidated Investment Company Limited
Filed Sept. 5, 1961, Ser. No. 136,074
Claims priority, application Republic of South Africa, Sept. 9, 1960, 3,689/60
4 Claims. (Cl. 85—62)

This invention relates to tension indicating devices. Although the purpose for which it was designed is to indicate the tension in roof bolts and this specification will discuss the device in relation to roof bolting, it is to be understood that the invention has wider application.

The art of roof bolting in mining tunnelling and so on is well known and widely practised. It is equally well known that the efficacy of the system depends upon the maintenance of the tension in the bolts in a predetermined range.

At installation, the use of a torque wrench is some assurance that the bolt sets out on its career in proper condition, although even this is not sure because of various imponderables such as variations in the screw-threading and in friction losses. However, even if the initial tension is correct, it will not necessarily remain so.

It is important from the point of view of safety and the general well-being of the mine that variations in tension outside a permitted range be detected and corrected. This involves periodic inspection of the bolts, which are usually not easily accessible and often all but invisible. These and other difficulties have detracted from the value of known indicating devices.

The object of the present invention is to provide an indicating device which is accurate, is capable of being easily inspected at a distance and except possibly where very accurate measurements are required for research work avoids the necessity of any measurement.

According to the invention the indicating device consists in a resiliently deformable body adapted to be springily deformed by tightening of the bolt, and indicator means projecting from the body and adapted to show the extent of deformation of the body.

Further according to the invention the body is a washer and the indicating means consists in at least one formation fast with the washer at or towards its periphery and extending forwardly from the convex face of the washer.

It will be appreciated that the degree of distortion of the washer due to the tightening of the bolt is a measure of the tension in the bolt, and that as the washer is progressively distorted, the angularity of the formation to the rock surface or intervening washer is correspondingly varied.

Thus the angularity of the formation at any time is a measure of the extent of deformation and correspondingly of the tension in the bolt.

To facilitate measurement of this angularity the invention provides a datum from which it can be readily observed. This may be a fixed datum such as a rigid projection from the bolt itself, but preferably it is another formation, diametrally opposed to the first. The angularity of each (being equal) is indicated by the distance apart of the formations, which distance is thus a measurement of the tension in the bolt. Under certain circumstances more than one fixed datum and/or pair of formations may be provided.

The invention consists also in the combination with the body and the indicating means discussed above of a gauge that measures the angularity of the formation to the bolt by means of the distance between the formation and a fixed datum, or between two opposed formations.

Various embodiments of the invention are illustrated in the accompanying drawings in which:

FIGURE 1 is a side view, partly sectioned of one embodiment utilizing one type of gauge,
FIGURE 2 is a side view of a second kind of gauge,
FIGURE 3 is a side view of a third kind of gauge,
FIGURE 4 is a side view of a fourth kind of gauge,
FIGURE 5 is a view of a hand measuring gauge,
FIGURE 6 is a perspective view of the washer used in FIGURE 1,
FIGURE 7 is a view of an alternative form of body,
FIGURE 8 is a section on the line 8—8 of FIGURE 7, and
FIGURE 9 is a view of still another alternative form of body.

In the drawings, the roof bolt 10 having a head 13 extends into a bore 12 in the rock face 14 where it is screwed into a captive nut that causes some wedging device or other to be expanded tightly against the wall of the bore. The nut and the wedging device are not illustrated, as they may take the form of any one of a large number of known kinds. Alternatively the unthreaded end of a stud may be anchored in the hole as by grouting and the head 13 is a nut screwed on to the stud.

Interposed between the head 13 of the bolt 10 and the fact 14 is a dished washer 16 having concave and convex sides and that either bears against the face, if the latter be flat, or against a flat washer 18 if it be not. The concavity of the washer 16 is directed away from the bolt head.

The dished washer 16 has, integral with it, two wing formations or lugs 20, 21 projecting away from the periphery of its convex face. These lugs extend away from washer 16 in substantially parallel relationship and have opposed holes 22, 23 towards their free ends.

Between the head of the bolt 10 and the washer 16 there is a spherical seat washer 19. In an appropriate case the head can bear directly on the washer 16 or a flat or cupped washer could be used in place of the washer 19. The latter is preferred because the spherical shape tends to compensate for an irregularity if the hole for the bolt is at an angle to the roof.

The dished washer 16 is flattened as the bolt is screwed home, and, as explained above, the extent of deformation of the washer is directly proportional to the tension in the bolt 10. As the washer is flattened, the lugs 20, 21 are caused to swing toward each other so that the extent of their deflection, and hence their distance apart, are measures of such tension.

To enable the spacing of the lugs to be visually inspected, a gauge is provided that is engaged with the lugs in a position of the lugs in which they are swung toward each other, corresponding to a tensioned condition of bolt 10. In the form shown in FIGURE 1, this gauge consists in a V-shaped metal plate 24, having shanks 26, 28. One shank 26 is notched at 30, while the other is plain.

While the bolt 10 is being screwed home, the gauge is engaged in the hole 22, with the notch 30 in register with lug 20. As the tension in the bolt increases, the washer 16 is flattened, the lugs 20, 21 converge, and the shank 28 progressively enters the hole 23. Indeed, the extent of penetration of the shank may be used as an indication of the desired tension, without the use of a torque wrench.

As the tension subsides in use, the lugs diverge until, when a predetermined minimum figure is reached, the gauge is dimensioned for the shank 28 to become disengaged from the lug 21. Thus, notch 30 and shank 28 are spaced apart a distance less than the distance between lugs 20, 21 when the washer is undeformed, so that as bolt tension lessens and the washer returns toward its undeformed configuration, one end of the gauge will fall down. The gauge then dangles from the lug 20, offering a plain visual signal that the bolt needs tightening.

In other words, the free ends of lugs 20 and 21 are spaced farther apart in the uncompressed condition of the washer than when the washer is compressed in use.

In FIGURE 2 the gauge is shown as having one shank 32 with several steps 34. The particular step that is engaged at any time with the lug 21 is a measure of the tension in the bolt. The steps may be joined by inclined surfaces 36, so that if the tension rises, as sometimes occurs, the gauge can move upwardly. The distance between lugs 20, 21, and the distances between the notch that corresponds to notch 30 and the steps, are so related that as the bolt tension decreases and the washer gradually resumes its undeformed condition, the lug 21 will move lengthwise outwardly from step to step of the shank 32, thereby to give a somewhat quantitative indication of the bolt tension. Finally, one end of the gauge falls down as before.

In FIGURE 3 the gauge is shown with shanks 38, 40 in the same direction. This gauge is designed to indicate a dangerous rise in tension.

In FIGURE 4, the gauge is in several parts 42, 43, 44 side by side, each dimensioned to become disengaged at a different tension. Thus, as the bolt slackens, one part after another drops away. The parts may be differently coloured in accordance with a standard code to permit very rapid and sure inspection. One or more of the several parts may be like the gauge shown in FIGURE 3 so that they drop away at rises in tension.

In a further development (not illustrated), the indicating formations are, or are associated with the plates of a condenser, so that the capacity of the condenser at any time is a measure of the tension in the bolt.

Alternatively the formations may be comprised in an electrical circuit and the resistance between them used as an indication of the tension.

In FIGURE 5 a hand measuring gauge is illustrated. The gauge has notches 51 corresponding to different values of tension. It may be calibrated as shown. By inserting the gauge between two lugs 20 and 21 the bolt tension at any given instant may be measured.

Many other forms of indicator are possible. It is not thought necessary to enumerate them all. Suffice it to say that any means which will measure the extent of displacement of the formation or formations due to the tension in the bolt is utilizable; that any of the forms can be allied with warning devices of many kinds, such as warning lights, bells and so on; and that the behaviour of the bolt can be recorded if desired.

Furthermore, the device of the invention can be developed by mechanical or other means to multiply the displacement of the formations to promote accuracy of reading or of observation. For instance there may be additional springy bodies operating in conjunction with the main body, with or without additional displaceable formations.

The washer 16 may be round but is preferably ellipsoidal, as shown. Where it is desired to increase the amount of movement at low tensions compared with the amount of movement at high tensions, the lugs are extended from the body of the washer as shown in FIGURE 7 so that the washer has wings 71 extending from it and from which the lugs 20 and 21 depend.

With the washer of FIGURE 7 at low tensions the wings 71 first make contact with the flat washer 18 (or the roof in the absence of such a washer). As the tension increases the contact line widens to something similar to that shown in FIGURE 1.

Note also that the wider the contact line, the higher the hysteresis of the washer becomes.

A washer 80 with extremely low hysteresis is illustrated in FIGURE 9. In this case the washer is in effect a leaf spring that has been holed at 81 to be threaded over the bolt and that is slightly widened around the hole 81 and bent for purposes of strength. In this case the contact between the washer 80 and a flat washer such as 18 in FIGURE 1 progressively widens as the tension increases. The accuracy of measurement at low tensions remains the highest but accuracy at higher tensions is not substantially impaired.

It may be necessary to use a plastic insert in one or both of the lug holes in order to ensure that rusting does not take place, thereby impairing the edges of the holes 22, 23 and making the device inaccurate. Furthermore, the distance between the edges on each lug hole can be more accurately controlled in manufacture.

The disadvantage of using plastic inserts is, of course, increased manufacturing costs.

I claim:

1. The combination of an anchor bolt having a head, a stem and anchoring means; a continuous tension indicating device consisting in a resiliently deformable washer having concave and convex sides adapted to be springily deformed by the head on tightening of the bolt and having a central opening to receive the bolt shank; two diametrically opposed wing formations extending from the periphery of the convex side and having opposed holes in each formation; a gauge spanning the distance between the two formations and having end shanks that enter the holes in the formations; and a notch on one end shank for hanging the gauge from one of said formations, the other shank being straight.

2. The combination claimed in claim 1 in which said other end shank is hooked to extend in the same direction as the first end shank.

3. The device of claim 1 in which said notch and said straight shank are spaced apart a distance less than the distance between said formations when the washer is undeformed, so that said straight shank becomes disengaged and drops from its formation when the spacing apart of the formations, and therefore the bolt tension, diverges from a predetermined value.

4. The device of claim 1 in which the gauge has one end shank that is held by one formation, and a second end shank that is stepped and supported by the other formation, the distance between said formations and the distances between said one end shank and the steps of the stepped end shank being such that the steps of the stepped end shank progressively become disengaged and drop from the formation supporting the stepped shank, as the spacing apart of the formations diverges from a predetermined value in respect of each step.

References Cited by the Examiner

UNITED STATES PATENTS 1,774,695   9/30   Baynes _____ 85—62

EDWARD C. ALLEN, *Primary Examiner.*

CARL W. TOMLIN, *Examiner.*